J. A. PETERS.
MOTOR CYCLE.
APPLICATION FILED JAN. 12, 1922.

1,416,745.

Patented May 23, 1922.

INVENTOR
J. A. Peters

UNITED STATES PATENT OFFICE.

JAMES ARTHUR PETERS, OF THE WHITE HOUSE, NEAR SCARBOROUGH, ENGLAND.

MOTOR CYCLE.

1,416,745.  Specification of Letters Patent.  Patented May 23, 1922.

Application filed January 12, 1922. Serial No. 528,682.

*To all whom it may concern:*

Be it known that I, JAMES ARTHUR PETERS, a British subject, residing at the White House, near Scarborough, Yorkshire, England, have invented certain new and useful Improvements in Motor Cycles, of which the following is a specification.

This invention relates to motor cycles having multi-speed belt-driven gearing wherein the driving pulley has a laterally movable flange and the driven shaft is adapted to be moved nearer to and further from the driving shaft in the operation of gear changing.

The object of the present invention is to provide an improved construction wherein the back-stays carrying the shaft desired to be moved are themselves hingedly mounted on the frame of the motor cycle.

A further object of the invention is to provide means comprising a manually-operated worm engaging with a toothed sector formed integrally with or fixedly secured to a pair of rocking links adapted to operate radius rods in the ends of which the driven shaft is held.

A further object is to provide the fixed and movable flanges of the driving pulley with curved inner surfaces that are convex to each other in order to accommodate the deformation of cross-section of the belt under changes of driving radius.

A further object is to eliminate lateral pulsations due to uneven driving torque by constructing the movable flange of considerable mass.

With this and other objects in view the invention consists in the features hereinafter described and claimed in the claiming clauses at the end hereof.

Figure 1:
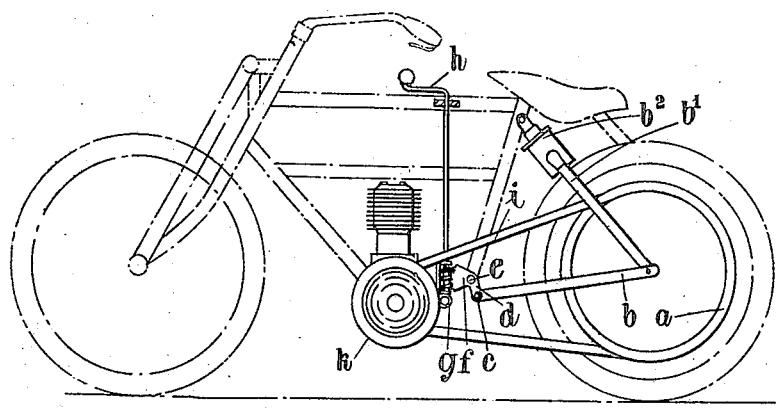
Figure 2:
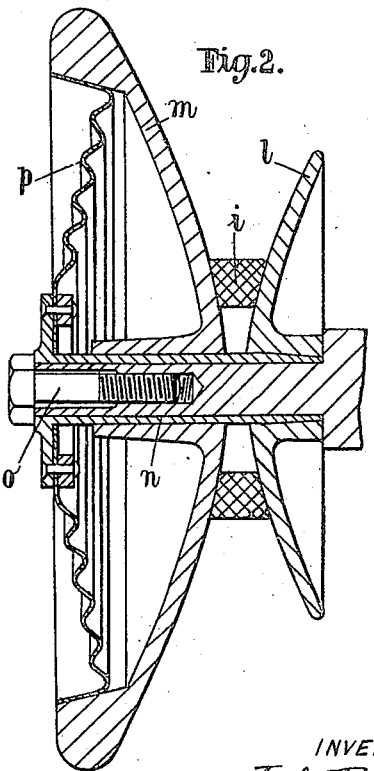

In the accompanying drawing Fig. 1 shows diagrammatically a general view of mechanism constructed according to the invention as applied to a motor cycle. Fig. 2 being an enlarged view of the driving-pulley of Fig. 1.

Referring now to the drawings, the driving-wheel $a$ of the motor cycle is held in a fork $b^1$ terminating at its upper end in a telescopic pillar $b^2$ hinged at its upper end to the frame and adapted to house spring mechanism to support the load. Obviously, a pair of hinged back-stays might alternatively be used instead of the combined fork and pillar and where the term fork is used in the subjoined claims it is intended to include two separately formed elements straddling the wheel irrespectively of the use of a single telescopic pillar. The position of the wheel axle relatively to the frame is determined by a pair of radius-rods $b$ hinged at $c$ to a pair of links $d$ mounted on the frame by means of a pivot $e$. The links $d$ are formed integrally with a toothed sector $f$ meshing with a worm $g$ adapted to be rotated by a handle $h$ suitably positioned for use by the rider. The wheel $a$ is directly driven by means of a belt $i$ from the driving-pulley $k$ mounted on the engine crank-shaft and illustrated separately at Fig. 2.

In the form shown, the pulley $k$ consists of two separate flanged parts $l, m$ of which the part $l$ is fixed upon the crank-shaft and the part $m$ is axially slidable thereon but rotates therewith. The two parts are shaped so as to produce a V-shaped groove to receive the belt $i$, the near or inner surfaces being suitably curved to accommodate the belt at any driving-radius. The belt is, as usual, trapezoidal in cross-section; but during working, the inclined sides tend to become more nearly parallel with increased curvature, owing to the increased tension of the upper surface and increased compression of the lower surface of the belt. Consequently, the theoretically most suitable forms of pulley flanges have surfaces that are convex towards each other as shown in Fig. 2, and I prefer to construct the present pulley accordingly.

The fixed flange $l$ is preferably provided with a tapered bore and is held in place against a shoulder on the crank-shaft by the split tapered bush $n$ which is held on the shaft by the screwed bolt $o$. The sliding flange $m$ is preferably weighted to serve either wholly or partly as the flywheel, and is engaged by a corrugated resilient diaphragm $p$ riveted to a flange on the bush $n$ and operating to force the flywheel inwardly towards the fixed flange $l$. The weighted rim serves to provide lateral inertia to resist irregular axial movement of the flange in the event of a jerking drive. The diaphragm $p$ transmits the rotation of the shaft to the flywheel $m$, thus avoiding wear and expense of machining occasioned by the use of keys, splines or the like; and its axial thrust is regulated so as to urge the belt to take the maximum driving-radius on the driving-pulley that is possible according to the position of the radius rod, without, however, engaging the belt with excessive frictions. Alternatively, the diaphragm may transmit the drive only, separate spring means being fitted to control axial movement.

It will be seen that if by operating the handle $h$ the wheel $a$ is caused to approach the engine, the diaphragm causes the flywheel $m$ to take up the slack in the belt and urge it away from the crank-shaft to work at an increased driving-radius, and that if the wheel $a$ is caused to recede from the crank-shaft, the belt is drawn inwardly between the flanges $l$, $m$ against the action of the diaphragm and works at a diminished driving-radius; and that in either case the gear ratio is suitably altered.

I claim:—

In a multi-speed control for motor cycles, including an automatically expansible drive pulley, a driven pulley for operating the rear wheel, a movable support for the drive pulley to permit said pulleys to be adjustably and relatively spaced, said support including a rod connected at its rear end to the axis of the driven pulley, links pivotally supported on the motor cycle and connected to the forward end of said rod, one end of said links being formed to provide a tooth sector, and a manually operable worm engaging said sector, whereby the links may be adjusted on their pivots to move the rod longitudinally, and a belt connecting the pulleys.

In testimony whereof I affix my signature.

JAMES ARTHUR PETERS.